United States Patent
Ben-Eli et al.

(10) Patent No.: US 8,588,768 B2
(45) Date of Patent: *Nov. 19, 2013

(54) RSSI ESTIMATION IN MULTI-TECHNOLOGY COMMUNICATION TERMINALS

(75) Inventors: David Ben-Eli, Modiin (IL); Tal Porat, Jerusalem (IL); Tamir Gazneli, Rehovot (IL); Nir Rosenzweig, Kfar Saba (IL); Oren Moravchik, Tel Aviv (IL); Daniel Ben-Ari, Moshav zur Natan (IL); Danny Alexander, Neve Efraim Monoson (IL)

(73) Assignee: Marvell World Trade Ltd, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/547,071

(22) Filed: Jul. 12, 2012

(65) Prior Publication Data

US 2012/0276917 A1 Nov. 1, 2012

Related U.S. Application Data

(63) Continuation of application No. 12/853,339, filed on Aug. 10, 2010, now Pat. No. 8,238,929.

(60) Provisional application No. 61/266,448, filed on Dec. 3, 2009.

(51) Int. Cl.
*H04W 24/00* (2009.01)

(52) U.S. Cl.
USPC ............. 455/425; 455/127.4; 455/435.2; 455/455; 455/437; 455/443; 455/453.2; 455/432.1; 340/13.27; 340/13.33; 340/431; 370/338; 370/331; 370/278

(58) Field of Classification Search
USPC ........... 455/127.4, 435.2, 455, 437, 443, 425, 455/434, 436; 370/328–338, 278, 431; 340/13.27, 13.33

See application file for complete search history.

(56) References Cited

U.S. PATENT DOCUMENTS

| | | | | |
|---|---|---|---|---|
| 6,085,076 A * | 7/2000 | Lindsay et al. | ............ | 455/277.1 |
| 6,466,606 B1 * | 10/2002 | Jou | ................................ | 375/130 |
| 7,047,006 B2 * | 5/2006 | Classon et al. | ................ | 455/434 |
| 7,215,703 B2 * | 5/2007 | Jensen et al. | ................... | 375/224 |
| 7,313,392 B2 * | 12/2007 | Cheng | ........................... | 455/423 |
| 8,238,929 B2 * | 8/2012 | Ben-Eli et al. | ............. | 455/452.2 |
| 2002/0098848 A1 * | 7/2002 | Bamburak et al. | ............ | 455/455 |

(Continued)

OTHER PUBLICATIONS

3rd Generation Partnership Project—Technical Specification Group Radio Access Network—User Equipment (UE) Radio Transmission and Reception (FDD) (Release 9), TS 25.101, version 9.3.0, section 5.2, Mar. 2010.

3rd Generation Partnership Project—Technical Specification Group GSM/EDGE—Radio Access Network—Radio Transmission and Reception (Release 9), TS 45.005, version 8.8.0, section 2, Mar. 2010.

(Continued)

*Primary Examiner* — Mahendra Patel
*Assistant Examiner* — Quan M Hua

(57) ABSTRACT

A method used in a receiver includes measuring first Received Signal Strength Indications (RSSIs) in respective first communication channels, which are located in a given frequency band and which each have a first channel bandwidth. Based on the first RSSIs, second RSSIs are computed for respective second communication channels, which are located in the given frequency band and which each have a second channel bandwidth that is larger than the first channel bandwidth. At least one of the first and second communication channels over which to receive signals at the receiver are selected using the first and second RSSIs.

16 Claims, 2 Drawing Sheets

(56) References Cited

U.S. PATENT DOCUMENTS

| | | | |
|---|---|---|---|
| 2002/0197992 A1* | 12/2002 | Nizri et al. | 455/435 |
| 2004/0018843 A1 | 1/2004 | Cerwall et al. | |
| 2004/0043798 A1* | 3/2004 | Amerga et al. | 455/574 |
| 2004/0142693 A1* | 7/2004 | Feder et al. | 455/443 |
| 2006/0194580 A1* | 8/2006 | Gruber | 455/436 |
| 2007/0026808 A1* | 2/2007 | Love et al. | 455/67.7 |
| 2008/0107071 A1 | 5/2008 | Tsigler et al. | |
| 2009/0163198 A1* | 6/2009 | Ray et al. | 455/425 |
| 2009/0279504 A1 | 11/2009 | Chin et al. | |

OTHER PUBLICATIONS

3rd Generation Partnership Project—Technical Specification Group Core Network and Terminals—Non-Access-Stratum (NAS) Functions Related to Mobile Station (MS) in Idle Mode (Release 8), TS 23.122, version 8.9.0, section 4, Mar. 2010.

3rd Generation Partnership Project—Technical Specification Group Radio Access Network—User Equipment (UE) Procedures in Idle Mode and Procedures for Cell Reselection in Connected Mode (Release 8), TS 25.304, version 8.8.0, section 5, Dec. 2009.

Chinese Patent Application # 201010579871.5 Office Action dated Jan. 24, 2013.

* cited by examiner

RSSI ESTIMATION IN MULTI-TECHNOLOGY COMMUNICATION TERMINALS

CROSS-REFERENCE TO RELATED APPLICATIONS

This application is a continuation of U.S. patent application Ser. No. 12/853,339, filed Aug. 10, 2010, which claims the benefit of U.S. Provisional Patent Application 61/266,448, filed Dec. 3, 2009. The disclosures of these related applications are incorporated herein by reference.

FIELD OF THE DISCLOSURE

The present invention relates generally to communication systems, and particularly to methods and systems for determining received signal strength and selecting networks in wireless receivers.

BACKGROUND

Wireless communication standards typically define a set of communication channels over which transmitters and receivers are to communicate. In particular, communication standards typically specify the frequencies and bandwidths of the communication channels. For example, the Third Generation Partnership Project (3GPP) specifies the communication channels for Universal Mobile Telecommunications System (UMTS) networks, in "$3^{rd}$ Generation Partnership Project—Technical Specification Group Radio Access Network—User Equipment (UE) Radio Transmission and Reception (FDD) (Release 9)," TS 25.101, version 9.3.0, March, 2010, section 5.2, which is incorporated herein by reference. The set of communication channels for Global System for Mobile communication (GSM) networks is specified in "$3^{rd}$ Generation Partnership Project—Technical Specification Group GSM/EDGE—Radio Access Network—Radio Transmission and Reception (Release 9)," TS 45.005, version 8.8.0, March, 2010, section 2, which is incorporated herein by reference. In some cases, frequency bands that are used by different Radio Access Technologies (RATs) overlap one another.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

An embodiment that is described herein provides a method used in a receiver. The method includes measuring first Received Signal Strength Indications (RSSIs) in respective first communication channels, which are located in a given frequency band and which each have a first channel bandwidth. Based on the first RSSIs, second RSSIs are computed for respective second communication channels, which are located in the given frequency band and which each have a second channel bandwidth that is larger than the first channel bandwidth. At least one of the first and second communication channels over which to receive signals at the receiver are selected using the first and second RSSIs.

In some embodiments, measuring the first RSSIs includes measuring signal strengths of the signals received over at least one of the first communication channels in accordance with a first Radio Access Technology (RAT), and the second communication channels correspond to a second RAT, different from the first RAT. In an embodiment, only one of the first and second RATs is active when the first RSSIs are measured, and selecting the at least one of the first and second communication channels includes identifying the active RAT.

In a disclosed embodiment, the method includes initiating communication with a base station of the identified active RAT in response to identifying the active RAT. In another embodiment, measuring the signal strengths includes receiving the signals of a Global System for Mobile communication (GSM) RAT, and computing the second RSSIs includes computing the second RSSIs in accordance with a Universal Mobile Telecommunications System (UMTS) RAT.

In yet another embodiment, computing the second RSSIs includes calculating a second RSSI for a respective second communication channel by summing the first RSSIs measured on a subset of the first communication channels overlapping the second communication channel. In an embodiment, summing the first RSSIs includes assigning respective weights to the first RSSIs in the subset, and summing the weighted first RSSIs. In another embodiment, summing the first RSSIs includes multiplying a sum of the first RSSIs in the subset by a factor that depends on respective first and second channel filter shapes of the first and second communication channels. In an embodiment, the receiver includes first and second reception circuitry for receiving the first and second communication channels, respectively, and the method includes deactivating the second reception circuitry during measurement of the first RSSIs.

There is additionally provided, in accordance with an embodiment that is described herein, a receiver that includes reception circuitry and processing circuitry. The reception circuitry is configured to receive first communication channels that are located in a given frequency band, each of the first communication channels having a first channel bandwidth, and to receive second communication channels that are located in the given frequency band, each of the second communication channels having a second channel bandwidth that is larger than the first channel bandwidth. The processing circuitry is configured to measure first Received Signal Strength Indications (RSSIs) in the respective first communication channels, to compute, based on the first RSSIs, second RSSIs for the respective second communication channels, and to select, using the first and second RSSIs, at least one of the first and second communication channels over which to receive signals at the receiver. In an embodiment, a mobile communication terminal includes the disclosed receiver. In another embodiment, a chipset for processing signals in a mobile communication terminal includes the disclosed receiver.

The present invention will be more fully understood from the following detailed description of the embodiments thereof, taken together with the drawings in which:

DETAILED DESCRIPTION OF EMBODIMENTS

Figure 1:
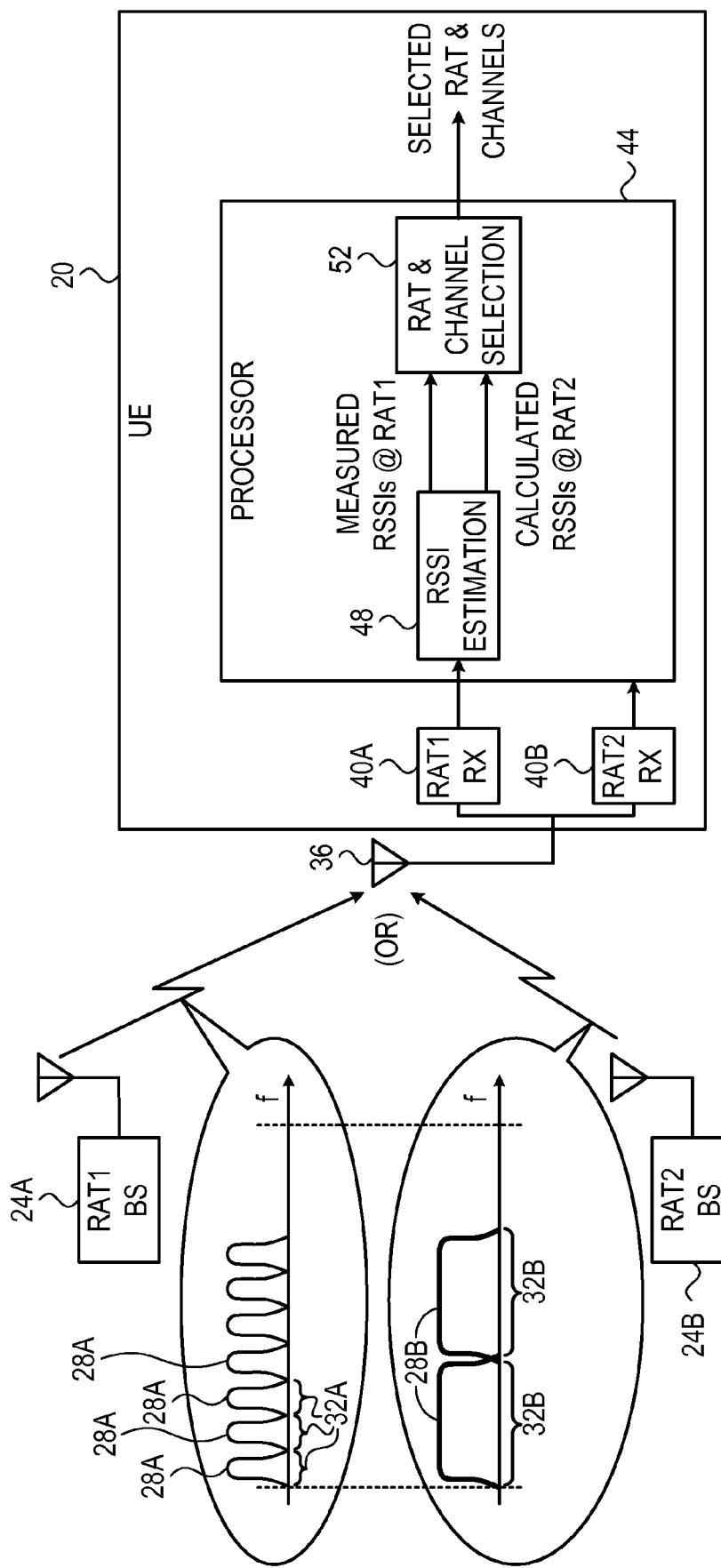
FIG. 1 is a block diagram that schematically illustrates a multi-technology wireless communication terminal, in accordance with an embodiment of the present disclosure.

Embodiments that are described herein provide improved methods and devices for operating multi-technology receivers. In particular, these methods and devices are concerned with receivers that support two or more Radio Access Technologies (RATs), whose respective frequency bands have at least partial overlap.

In some embodiments, a receiver supports a first RAT that operates in first communication channels and a second RAT that operates in second communication channels. Each of the first communication channels has a first bandwidth, and each of the second communication channels has a second bandwidth, larger than the first bandwidth. The first communication channels overlap the second communication channels, at least in a given frequency band. In an example embodiment, the receiver supports both Wideband Code-Division Multiple Access (WCDMA) and GSM in the same frequency band. In accordance with current standards, each WCDMA channel has a bandwidth of approximately 4.2 MHz, and each GSM channel has a bandwidth of approximately 200 KHz.

In some scenarios, the receiver receives downlink signals according to one of the RATs (referred to as "active RAT"), but has no a-priori information as to the identity of the active RAT. For example, when the receiver initially attempts to join a communication network, it sometimes has no information whether to expect signals in accordance with the first RAT or the second RAT. A scenario of this sort can occur, for example, when a communication terminal moves ("roams") to a new geographical area.

In some embodiments that are described herein, the receiver attempts to identify the active RAT by performing Received Signal Strength Indication (RSSI) measurements only in the first communication channels of the first RAT. The receiver calculates estimated RSSIs for the second communication channels of the second RAT, based on the measured first-RAT RSSIs. In an example embodiment, the receiver performs RSSI measurements in GSM channels, and calculates estimated RSSIs for WCDMA channels based on the measured GSM channel RSSIs.

Since each second (wider) communication channel typically overlaps several first (narrower) communication channels, the receiver is able to compute the second RSSIs for the second communication channels based on the first RSSIs that were measured in the first communication channels. The receiver then identifies and selects the active RAT using the measured RSSIs of the first communication channels and the calculated RSSIs of the second communication channels. In a typical embodiment, the receiver selects an order of scanning at least some of the first and/or second communication channels based on the measured RSSIs of the first communication channels and the calculated RSSIs of the second communication channels. The receiver then scans the communication channels according to this order, so as to identify and select the active RAT. In some embodiments, the receiver also identifies and selects one or more communication channels of the active RAT, over which the downlink signals are to be received.

When using the disclosed techniques, the receiver estimates the second RSSIs for the second frequency channels without having to actually measure the RSSIs according to the second RAT. As a result, the receiver is able to identify the active RAT at high speed, and the user experiences only small latency before connecting to the active communication network. The reduction in latency is particularly important in multi-band terminals, but the disclosed techniques are useful in both single-band and multi-band applications.

In some embodiments, the receiver comprises separate RF reception circuitry for receiving the first and second RATs. When using the disclosed techniques, the receiver may disable the reception circuitry of the second RAT during the RAT identification process. As a result, power consumption is reduced and battery time is extended.

FIG. 1 is a block diagram that schematically illustrates a wireless communication terminal 20, also referred to as User Equipment (UE), in accordance with an embodiment of the present disclosure. UE 20 may comprise, for example, a cellular phone, a communication-enabled mobile computing device, a cellular adapter for a mobile computing device, or any other suitable communication terminal.

UE 20 is a multi-technology terminal, i.e., it is designed to communicate in accordance with two or more Radio Access Technologies (RATs). In the present context, the term RAT refers to a communication protocol or air interface, which defines the use of the radio resource for transmission. In particular, a given RAT typically specifies channel frequencies, channel bandwidth, channel raster (i.e., frequency offset between adjacent channel indices), signal waveforms and modulation schemes, and/or any other suitable signal property.

In the present example, the UE supports two RATs denoted RAT1 and RAT2, e.g., GSM and WCDMA, respectively. As such, UE 20 is designed to receive downlink signals from RAT1 Base Stations (BSs) 24A and from RAT2 BSs 24B. FIG. 1 shows both BSs 24A and BSs 24B simultaneously for the sake of clarity. In real-life scenarios, however, the UE receives signals according to only one RAT at a given time. For example, at a certain time the UE may operate in a geographical area that is covered by RAT1 BSs, and at some other time roam into another area that is covered by RAT2 BSs.

According to RAT1, BSs 24A transmit downlink signals 28A in first communication channels 32A. According to RAT2, BSs 24B transmit downlink signals 28B in second communication channels 32B. Each first communication channel 32A has a first bandwidth, and each second communication channel 32B has a second bandwidth, larger than the first bandwidth. As seen in the figure, channels 32A of RAT1 overlap channels 32B of RAT2, at least in a given frequency band. Although in FIG. 1 all channels 32A and 32B are shown as if they contain signals, in real-life scenarios each BS transmits signals only in a certain subset of its channels, or even in a single channel.

In the present example, RAT1 comprises Global System for Mobile communications (GSM), and RAT2 comprises Universal Mobile Telecommunications System (UMTS— also referred to as Wideband Code-Division Multiple Access—WCDMA). In accordance with present standards promulgated by 3GPP, each GSM channel has a bandwidth of approximately 200 KHz, and each WCDMA channel has a bandwidth of approximately 4.2 MHz. In this embodiment, both RAT1 and RAT2 have a channel raster of 200 KHz. In the present example, the WCDMA band is fully contained within the GSM band. According to the 3GPP specifications cited above, for example, WCDMA downlink band II is defined between 1930-1990 MHz, and the GSM PCS1900 downlink band is allocated the same band. As another example, both the WCDMA downlink band V and the GSM850 downlink band are defined between 869-894 MHz. In alternative embodiments, the RAT1 and RAT2 bands may overlap, fully or partially, in any other way.

In alternative embodiments, each of RAT1 and RAT2 may comprise any other suitable RAT having any suitable channel bandwidth and raster. The channel raster need not necessarily be the same in both RATs. Other RAT combinations that can be identified using the disclosed techniques comprise, for example, GSM and CDMA, or GSM and Long-Term Evolution (LTE).

UE 20 comprises an antenna 36 for receiving downlink Radio Frequency (RF) signals from BSs 24A and 24B. A RAT1 receiver (RX) 40A receives downlink signals according to RAT1. A RAT2 receiver 40B receives downlink signals according to RAT2. Each receiver typically down-converts the received RF signal and applies suitable filtering and amplification to the down-converted signal, according to the applicable RAT. In an embodiment, each receiver outputs an analog signal corresponding to a single communication channel (e.g., a single channel 32A from RX 40A or a single channel 32B from RX 40B) at a given time. In some embodiments, certain circuitry (e.g., low-noise amplification and/or broadband down-conversion circuitry) is shared between receivers 40A and 40B.

UE 20 further comprises a processor 44, also referred to as processing circuitry, which processes the signals that are produced by receiver 40A or 40B in order to demodulate and otherwise reconstruct the received downlink signals. In particular, processor 44 determines Received Signal Strength Indications (RSSIs) on RAT1 channels 32A and RAT2 channels 32B, using methods that are described in detail further below. Processor 44 comprises an RSSI estimation unit 48, which measures RSSIs on RAT1 channels 32A, and calculates estimated RSSIs for RAT2 channels 32B based on the measured RAT1 channel RSSIs. Processor 44 further comprises a RAT&channel selection unit 52, which identifies the active RAT and active channels based on the measured RAT1 RSSIs and calculated RAT2 RSSIs.

The UE configuration shown in FIG. 1 is a simplified example configuration, which is depicted solely for the sake of conceptual clarity. In alternative embodiments, any other suitable UE configuration can be used. For example, the UE may support three or more RATs. UE elements that are not necessary for understanding the disclosed techniques have been omitted from the figure for the sake of clarity. For example, the UE typically comprises transmission elements (not shown in the figure) for transmitting uplink signals toward the RAT1 or RAT2 BSs.

The different elements of UE 20 may be implemented using dedicated hardware, such as using one or more Application-Specific Integrated Circuits (ASICs) and/or Field-Programmable Gate Arrays (FPGAs). Alternatively, some UE elements, and in particular processor 44 or parts thereof, may be implemented using software running on general-purpose hardware, or using a combination of hardware and software elements.

Typically, processor 44 comprises a programmable processor, which is programmed in software to carry out the functions described herein, although it too may be implemented on dedicated hardware. The software may be downloaded to the processor in electronic form, over a network, for example, or it may, alternatively or additionally, be provided and/or stored on non-transitory tangible media, such as magnetic, optical or electronic memory. In some embodiments, some or all of the elements of UE 20 may be fabricated in a chip-set.

Typically, only one RAT is active in a given frequency band, e.g., as decided by a service provider in a given geographical area. In some scenarios, UE 20 seeks network coverage in order to provide the end user service to some extent, but has no a-priori information as to whether the active RAT is RAT1 or RAT2. Such a scenario occurs, for example, when UE 20 initially attempts to join a communication network. For example, the UE may be switched on within the coverage area of a given network, or it may "roam" to another geographical area.

In some embodiments, processor 44 carries out a process that automatically identifies the active RAT, and possibly one or more active channels of this RAT. In an embodiment, RSSI estimation unit 48 processor 44 measures respective first RSSIs in channels 32A of RAT1. Each first RSSI indicates the received signal strength that was measured in a respective channel 32A of RAT1. Using the measured RAT1 RSSIs, unit 48 computes second RSSIs for channels 32B of RAT2. Each second RSSI estimates the received signal strength in a respective channel 32B of RAT2.

In an example embodiment, unit 48 estimates the RAT2 RSSI of a certain channel 32B by summing the RAT1 RSSIs over the RAT1 channels 32A that are contained in that channel 32B. (In some embodiments, the RSSI values are given on a logarithmic scale, for example in dBm. The summation of RSSI values in these embodiments refers to summing the linear signal strength values and converting the sum back to the logarithmic scale.) As seen in FIG. 1, each channel 32B overlaps several channels 32A. In the GSM/WCDMA example described above, each WCDMA channel overlaps approximately 4.2 MHz/200 KHz=21 GSM channels. In an embodiment, unit 48 estimates the RSSI of a given WCDMA channel by summing the twenty-one RSSIs that were measured in the twenty-one GSM channels that overlap this WCDMA channel.

In some embodiments, unit 48 multiplies the measured RAT1 RSSIs by certain weights before summing them, to produce an estimated RAT2 RSSI. In an example embodiment, unit 48 assigns higher weights to the RAT1 RSSIs of the RAT1 channels 32A that are located in the middle of the RAT2 channel 32B in question, and lower weights to the RAT1 RSSIs of the RAT1 channels 32A that are on the edges of this RAT2 channel 32B.

In another embodiment, unit 48 sums the RAT1 RSSIs of the RAT1 channels 32A contained in a given RAT2 channel 32B, with or without weighting. Unit 48 then scales the summation result by a certain scaling factor, to produce the estimated RAT2 RSSI. The scaling factor may depend, for example, on the modulation pulse shapes (which generally correspond to the respective channel filter shapes) of RAT1 and RAT2. Further alternatively, unit 48 in processor 44 may compute the estimated RAT2 RSSIs for channels 32B based on the measured RAT1 RSSIs of channels 32A using any other suitable method.

In some embodiments, RAT&channel selection unit 52 in processor 44 identifies the active RAT using the measured RAT1 RSSIs and calculated RAT2 RSSIs, which were produced by unit 48. In an example embodiment, unit 52 searches the calculated RSSIs for a predefined channel RSSI pattern. For example, RAT2 channels (32B) often have a distinct RSSI value pattern spread over 4.2 MHz. Finding a similar pattern in the calculated RAT2 RSSIs might strongly indicate that RAT2 is the active RAT. In some embodiments, unit 52 may regard the RAT that is characterizes by the highest RSSIs (measured or calculated) as the active RAT. In an embodiment, the highest RSSIs are also required to exceed a certain RSSI threshold.

In some embodiments, unit 52 defines an order of scanning at least some of the RAT1 and/or RAT2 channels based on the measured RAT1 RSSIs and the calculated RAT2 RSSIs. In an example embodiment, the order scans the RAT1 and RAT2 channels in descending order of RSSI. The receiver then scans the communication channels according to this order, so as to identify the active RAT. In an embodiment, scanning the channels in the above-described order also enables the receiver to find a particular channel for communication using the active RAT.

Further aspects of RAT selection are addressed in 3GPP Technical Specification TS 23.122, entitled "$3^{rd}$ Generation Partnership Project—Technical Specification Group Core Network and Terminals—Non-Access-Stratum (NAS) Functions Related to Mobile Station (MS) in Idle Mode (Release 8)," version 8.9.0, March, 2010, section 4, and in 3GPP Technical Specification TS 25.304, entitled "3$^{rd}$ Generation Partnership Project—Technical Specification Group Radio Access Network—User Equipment (UE) Procedures in Idle Mode and Procedures for Cell Reselection in Connected Mode (Release 8)," version 8.8.0, December, 2009, section 5, which are incorporated herein by reference.

In some embodiments, unit 52 also selects one or more active channels of the active RAT, in which downlink signals are to be received at the UE. In an example embodiment, after identifying the active RAT, unit 52 selects the channels of that RAT that have the strongest RSSIs.

It is noted that estimation of the RAT2 RSSIs is performed without actually measuring the RSSIs on channels 32B according to RAT2. The only actual measurements are the RAT1 RSSI measurements carried out over channels 32A of RAT1. In the present GSM/WCDMA example, the disclosed techniques reduce the network identification time by several seconds, in comparison with direct measurements of the RAT2 RSSIs.

In some embodiments, processor 44 deactivates RAT2 receiver 40B during the RAT identification process. Deactivation of this sort is possible because the identification process uses only the signals produced by RAT1 receiver 40A, and not the signals produced by RAT2 receiver 40B. This technique reduces the power consumption of the UE, and therefore extends its standby time.

Figure 2:
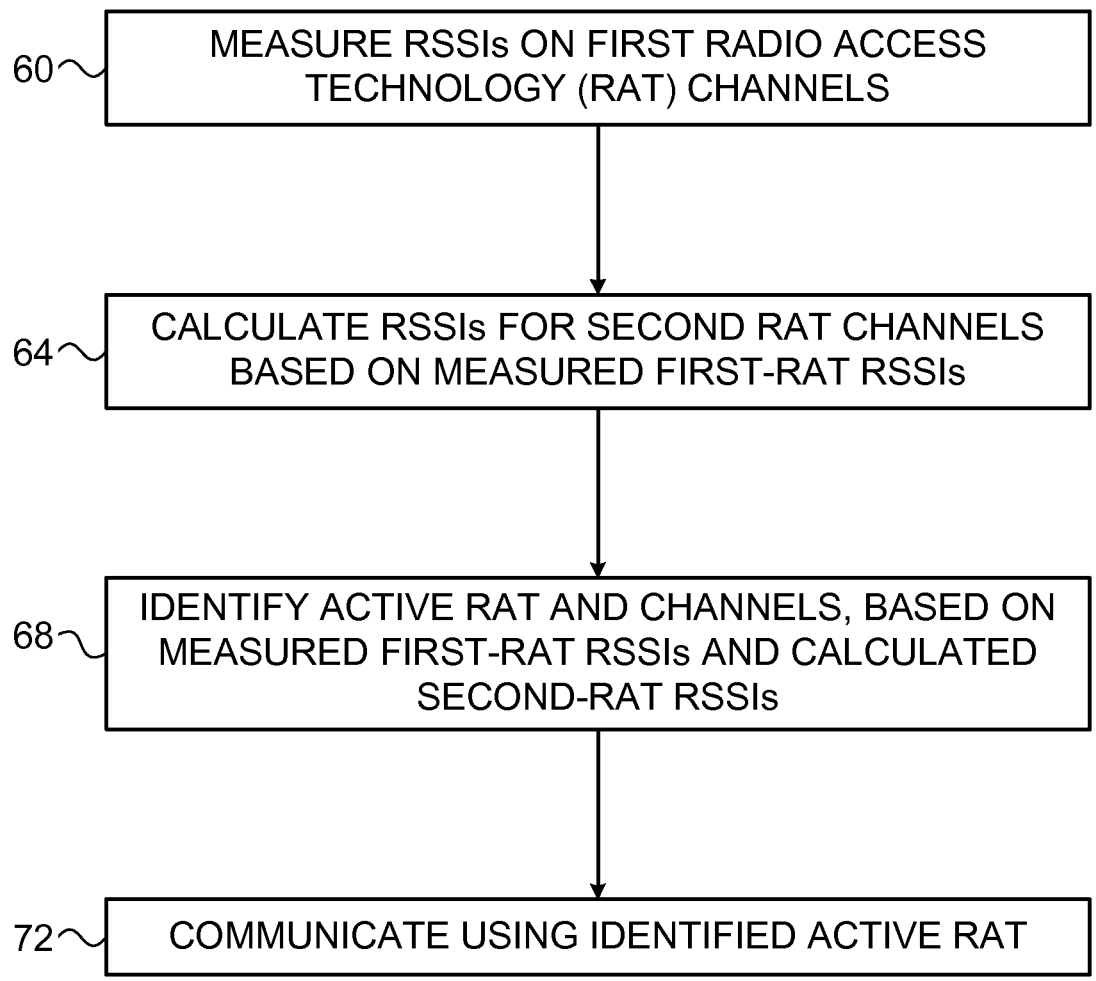
FIG. 2 is a flow chart that schematically illustrates a method for communication in a multi-technology wireless communication terminal, in accordance with an embodiment of the present disclosure.

FIG. 2 is a flow chart that schematically illustrates a method for communication in wireless communication terminal 20, in accordance with an embodiment of the present disclosure. The method begins with unit 48 in processor 44 measuring respective RSSIs in channels 32A of RAT1, at a measurement operation 60. In the GSM/WCDMA example embodiment, unit 48 measures the RSSIs in the GSM channels.

Based on the measured RAT1 RSSIs, unit 48 calculates respective RAT2 RSSIs for channels 32B of RAT2, at a calculation operation 64. In the GSM/WCDMA example embodiment, unit 48 calculates a respective RSSI for each WCDMA channel, based on the measured RSSIs of the GSM channels that overlap this WCDMA channel.

Based on the measured GSM RSSIs and calculated WCDMA RSSIs, unit 52 in processor 44 identifies the active RAT, at an identification operation 68. In the GSM/WCDMA example embodiment, unit 52 identifies whether the active RAT is GSM or WCDMA. In an embodiment, unit 52 also identifies the actual channels of the active RAT in which signals are received by the UE. In an embodiment, once processor 44 has identified the active RAT, it identifies the active channels, which corresponds to BSs of this RAT that are received by the UE.

The UE then begins to communicate using the identified active RAT, Typically, the UE communicates using one or more of the channels that were identified as active. In an example embodiment, processor 44 selects one or more BSs that are candidates for registration by the UE, and attempts to lock on the BS having the strongest signal.

In some embodiments, processor 44 measures and represents the RAT1 RSSIs over a wide dynamic range, in order to enable successful calculation of the RAT2 RSSIs. Consider, for example, a WCDMA/GSM UE. In this application, measuring and representing the GSM RSSIs down to a minimum sensitivity of −105 dBm is typically sufficient for identifying active GSM channels. If such a sensitivity were used for calculating WCDMA RSSIs, however, the WCDMA RSSIs would have a minimum sensitivity of −105+13=−92 dBm. (The 13 dB factor originates from the summation over twenty-one GSM channels to produce each calculated WCDMA RSSI.) This sensitivity is sometimes insufficient for accurate estimation of the WCDMA RSSIs—Weak WCDMA carriers may be indistinguishable from noise with this sort of sensitivity. In other words, a sensitivity of this sort would create a relatively high RSSI floor in the WCDMA RSSI calculation, a floor that would make weak WCDMA channels indistinguishable from noise. Therefore, in an embodiment, processor 44 measures and represents the GSM RSSIs at an improved minimum sensitivity of −110 dBm. As a result, the WCDMA RSSIs can be estimated at a sensitivity of −97 dBm, which is generally sufficient.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
receiving signals using a receiver that supports, in a given frequency band, a first set of first communication channels each having a first channel bandwidth, and a second set of second communication channels each having a second channel bandwidth that is larger than the first channel bandwidth;
measuring first Received Signal Strength Indications (RSSIs) for the respective first communication channels;
computing second RSSIs for the respective second communication channels, by applying to a plurality of the first RSSIs an arithmetic computation comprising calculating a second RSSI for a respective second communication channel by summing the first RSSIs measured on a subset of the first communication channels overlapping the second communication channel, and multiplying a sum of the first RSSIs in the subset by a factor that depends on respective first and second channel filter shapes of the first and second communication channels; and
selecting from among the first and second sets, using the measured first RSSIs and the computed second RSSIs, at least one of the communication channels over which to receive the signals at the receiver.

2. The method according to claim 1, wherein measuring the first RSSIs comprises measuring signal strengths of the signals received over at least one of the first communication channels in accordance with a first Radio Access Technology (RAT), and wherein the second communication channels correspond to a second RAT, different from the first RAT.

3. The method according to claim 2, wherein only one of the first and second RATs is active when the first RSSIs are measured, and wherein selecting the at least one of the communication channels comprises identifying the active RAT.

4. The method according to claim 2, comprising, in response to identifying the active RAT, initiating communication with a base station of the identified active RAT.

5. The method according to claim 2, wherein measuring the signal strengths comprises receiving the signals of a Global System for Mobile communication (GSM) RAT, and wherein computing the second RSSIs comprises computing the second RSSIs in accordance with a Universal Mobile Telecommunications System (UMTS) RAT.

6. The method according to claim 1, wherein summing the first RSSIs comprises assigning respective weights to the first RSSIs in the subset, and summing the weighted first RSSIs.

7. The method according to claim 1, wherein the receiver includes first and second reception circuitry for receiving the first and second communication channels, respectively, and comprising deactivating the second reception circuitry during measurement of the first RSSIs.

8. A receiver, comprising:
reception circuitry, which is configured to receive signals in a given frequency band in a first set of first communication channels each having a first channel bandwidth, and in a second set of second communication channels each having a second channel bandwidth that is larger than the first channel bandwidth; and
processing circuitry, which is configured to measure first Received Signal Strength Indications (RSSIs) for the respective first communication channels, to compute second RSSIs for the respective second communication channels by applying to a plurality of the first RSSIs an arithmetic computation comprising calculating a second RSSI for a respective second communication channel by summing the first RSSIs measured on a subset of the first communication channels overlapping the second communication channel and multiplying a sum of the first RSSIs in the subset by a factor that depends on respective first and second channel filter shapes of the first and second communication channels, and to select from among the first and second sets, using the measured first RSSIs and the computed second RSSIs, at least one of the communication channels over which to receive the signals by the reception circuitry.

9. The receiver according to claim 8, wherein the reception circuitry is configured to receive the signals in at least one of the first communication channels in accordance with a first Radio Access Technology (RAT), and wherein the second RSSIs second communication channels correspond to a second RAT, different from the first RAT.

10. The receiver according to claim 9, wherein only one of the first and second RATs is active when the first RSSIs are measured, and wherein the processing circuitry is configured to identify the active RAT.

11. The receiver according to claim 10, wherein the processing circuitry is configured to initiate communication with a base station of the identified active RAT in response to identifying the active RAT.

12. The receiver according to claim 9, wherein the processing circuitry is configured to measure the first RSSIs by measuring the signals of a Global System for Mobile communication (GSM) RAT, and to compute the second RSSIs in accordance with a Universal Mobile Telecommunications System (UMTS) RAT.

13. The receiver according to claim 8, wherein the processing circuitry is configured to assign respective weights to the first RSSIs in the subset, and to sum the weighted first RSSIs.

14. The receiver according to claim 8, wherein the reception circuitry comprises first and second circuitry for receiving the first and second communication channels, respectively, and wherein the processing circuitry is configured to deactivate the second circuitry during measurement of the first RSSIs.

15. A mobile communication terminal comprising the receiver of claim 8.

16. A chipset for processing signals in a mobile communication terminal, comprising the receiver of claim 8.

* * * * *